(12) United States Patent
Joshi et al.

(10) Patent No.: US 9,158,528 B2
(45) Date of Patent: Oct. 13, 2015

(54) FORCIBLY COMPLETING UPGRADE OF DISTRIBUTED SOFTWARE IN PRESENCE OF FAILURES

(71) Applicant: Oracle International Corporation, Redwood City, CA (US)

(72) Inventors: Sameer Joshi, San Jose, CA (US); Jonathan Creighton, Oakland, CA (US); Suman R. Bezawada, Bangalore (IN); Kannabran Viswanathan, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 235 days.

(21) Appl. No.: 13/633,776

(22) Filed: Oct. 2, 2012

(65) Prior Publication Data

US 2014/0096121 A1    Apr. 3, 2014

(51) Int. Cl.
| | |
|---|---|
| G06F 15/173 | (2006.01) |
| G06F 12/00 | (2006.01) |
| G06F 9/445 | (2006.01) |
| G06F 17/30 | (2006.01) |
| H04L 12/24 | (2006.01) |

(52) U.S. Cl.
CPC ............ *G06F 8/65* (2013.01); *G06F 17/30067* (2013.01); *H04L 41/0893* (2013.01)

(58) Field of Classification Search
CPC ............ H04L 41/0893; H04L 41/5003; G06F 17/30067
See application file for complete search history.

(56) References Cited

U.S. PATENT DOCUMENTS

| | | | |
|---|---|---|---|
| 6,745,286 B2* | 6/2004 | Staub et al. .................. 711/114 |
| 6,854,069 B2* | 2/2005 | Kampe et al. ................ 714/4.12 |
| 7,054,927 B2* | 5/2006 | Ulrich et al. .................. 709/223 |
| 8,214,590 B2* | 7/2012 | Ulrich et al. .................. 711/114 |
| 8,776,050 B2* | 7/2014 | Plouffe et al. ..................... 718/1 |
| 8,943,513 B2* | 1/2015 | Ulrich et al. .................. 718/105 |
| 2005/0080801 A1* | 4/2005 | Kothandaraman et al. ... 707/100 |
| 2007/0028244 A1* | 2/2007 | Landis et al. ................. 718/108 |
| 2007/0169083 A1 | 7/2007 | Penubolu |
| 2008/0040369 A1* | 2/2008 | Warner et al. ................. 707/101 |
| 2009/0089567 A1* | 4/2009 | Boland et al. ..................... 713/2 |
| 2009/0144720 A1 | 6/2009 | Roush |

(Continued)

OTHER PUBLICATIONS

Bezek et al., Agent-oriented software engineering: a comparison of agent and non-agent version of a cluster server, Jul. 2003, 2 pages.*

(Continued)

*Primary Examiner* — Thuy Dao
(74) *Attorney, Agent, or Firm* — Shun Yao; Park, Vaughan, Fleming & Dowler LLP

(57) ABSTRACT

One embodiment of the present invention provides a system for facilitating an upgrade of a cluster of servers in the presence of one or more inaccessible nodes in the cluster. During operation, the system receives an instruction to upgrade an older version of a distributed software program installed on each of a plurality of nodes forming the cluster. The system installs and activates a newer version of software on a subset of the plurality of nodes, the subset having fewer nodes than the entire cluster. The system receives an instruction to forcibly upgrade the cluster. Subsequently, the system upgrades the cluster so that the subset of nodes operate with the newer version of software, in which each node remains a member of the cluster during the upgrade.

20 Claims, 5 Drawing Sheets

(56) References Cited

U.S. PATENT DOCUMENTS

| | | | |
|---|---|---|---|
| 2010/0228839 A1* | 9/2010 | Pal et al. | 709/221 |
| 2013/0054426 A1* | 2/2013 | Rowland et al. | 705/27.2 |

OTHER PUBLICATIONS

Pai et al., Locality-aware request distribution in cluster-based network servers, Dec. 1998, 12 pages.*

"Performing the node rescue when the node boots", http://publib.boulder.ibm.com/infocenter/svc/ic/index.jsp?topic=%2fcom.ibm.storage.svc.console.doc%2fsvc_noderescu_223e80.html, retrieved Oct. 10, 2012.

"Managing the Running Cluster", http://docstore.mik.ua/manuals/hp-ux/en/b3936-90122/ch05s03.html, retrieved Oct. 10, 2012.

"Upgrading CSM Software", 78-16119-01, Cisco MDS SAN-OS Release 1.3, http://www.cisco.com/en/us/docs/storage/san_switches/mds9000/sw/svc/configuration/guide/upgrade.pdf, retrieved Oct. 10, 2012.

"About upgrading SFW HA using the rolling upgrades", Jan. 25, 2012, http://www.symantec.com/business/support/index?page=content&id=howto66006, retrieved Oct. 10, 2012.

"Introduction to Oracle Clusterware", Administration and Deployment Guide 11 g release 1 (11.1) B28255-07, Aug. 2010, http://docs.oracle.com/cd/e11882_01/rac.112/e16794/intro.htm#babjiche, retrieved Oct. 10, 2012.

"Upgrade the Windows File System iDataAgent—Clustered Environment", http://documentation.commvault.com/hds/release_8_0_0/_books_online_1/english_us/deployment/upgrade/upgrade.htm?windows_cluster, retrieved Oct. 10, 2012.

"Shadowbase Solutions—Continuous Availability and Active/Active Systems", http://www.gravic.com/shadowbase/uses/continuousavailability.html, retrieved Oct. 10, 2012.

"How to Proceed When Upgrade to 11.2 Grid Infrastructure Cluster Fails (ID 1364947.1)", Nov. 6, 2011.

Ajmani, Sameer "Automatic Software Upgrades for Distributed Systems", Sep. 2004.

"F How to Upgrade to Oracle Grid Infrastructure 11 g Release 2", 2007, http://docs.oracle.com/cd/E11882_01/install.112/e22489/procstop.htm, retrieved Oct. 10, 2012.

"What's New in Oracle Infrastructure Installation and Configuration?", 2007, http://docs.oracle.com/cd/E11882_01/install.112/e22489/whatsnew.htm, retrieved Oct. 10, 2012.

* cited by examiner

FORCIBLY COMPLETING UPGRADE OF DISTRIBUTED SOFTWARE IN PRESENCE OF FAILURES

CROSS-REFERENCE TO RELATED APPLICATIONS

The subject matter of the present application is related to U.S. Pat. No. 7,360,208, issued on Apr. 15, 2008, entitled "Rolling Upgrade of Distributed Software with Automatic Completion," the entirety of which is incorporated herein by reference.

BACKGROUND

1. Field of the Invention

The present disclosure relates to distributed computing. More specifically, the present disclosure relates to a method and system for forcibly completing an upgrade of distributed software in the presence of the failure of one or more nodes.

2. Related Art

Clustering software brings together independent servers that cooperate as a single system. The clustering software may support rolling upgrades of distributed software in which each node can be upgraded one at a time. During a rolling upgrade, the cluster remains in operation and clients do not suffer from an outage of the cluster. An administrator brings down each node, installs a new software version, and then activates the new software version on the node.

The nodes of a cluster operate at a common level called the acting version. The acting version of the distributed software is a version that can be supported by each node in the cluster. While performing the upgrade on the individual nodes, the nodes continue to operate and communicate under a previous acting version of the distributed software. After upgrading all the individual nodes, the entire cluster can be upgraded to operate according to a new acting version supported by the new version of the software. For example, network communication protocols or disk storage formats are not changed until the acting version for the entire cluster changes.

Often, the cluster being upgraded contains a large number of nodes. As the cluster size increases, there is a higher likelihood of a node failure, causing the node to become inaccessible during an upgrade or patching process. The customer may be able to upgrade a subset of the nodes but other nodes remain inaccessible. For example, a node may become inaccessible due to a fire, hardware or software issues, or power disruption. When one or more nodes of the cluster are inaccessible, the administrator must terminate the cluster upgrade process and downgrade all the nodes. Administrators cannot remove the inaccessible nodes from the cluster during the middle of an upgrade.

Downgrading is a manual, non-rolling process and the administrator must take down the entire cluster, resulting in full cluster outage. For example, with one inaccessible node in a cluster of size n, the administrator potentially performs n-1 steps to downgrade, remove the one node, and redo the n-1 steps to upgrade. After completing the downgrade, the administrator can start up the older software version and remove the inaccessible nodes. After removing the inaccessible nodes, the upgrade process can be restarted with the reduced cluster size.

Unfortunately, downgrading the cluster and taking the entire cluster out of service can severely impact productivity and is unacceptable in most business-critical environments.

SUMMARY

One embodiment of the present invention provides a system for facilitating an upgrade of a cluster of servers in the presence of one or more inaccessible nodes in the cluster. During operation, the system receives an instruction to upgrade an older version of a distributed software program installed on each of a plurality of nodes forming the cluster. The system then installs and activates a newer version of software on a subset of the plurality of nodes, the subset having fewer nodes than the entire cluster. The system receives an instruction to forcibly upgrade the cluster. Subsequently, the system upgrades the cluster so that the subset of nodes operate with the newer version of software, wherein each node remains a member of the cluster during the upgrade.

In a variation on this embodiment, the system removes a node from the cluster in response to an instruction to remove the node from the cluster. Then, the system receives an instruction to add the node to the cluster. The system activates the newer version of software on the node and joins the node to the cluster so that the node becomes an active member of the cluster.

In a variation on this embodiment, the system activates a copy of the newer version of software previously installed on an inactive node in the cluster. Then, the system joins the node to the cluster so that the node becomes an active member of the cluster.

In a variation on this embodiment, the system displays a message indicating one or more nodes of the cluster have not been upgraded with the cluster upgrade.

In a variation on this embodiment, the cluster remains operational during the upgrade of the cluster and at least one node of the cluster remains inaccessible for a duration of time after the upgrade of the cluster.

In a variation on this embodiment, the force upgrade instruction is sent from an administrator and received through one of the subset of nodes.

In a variation on this embodiment, the system performs a pre-check prior to performing the upgrade on the cluster, and aborts the upgrade if any accessible node of the cluster has not been upgraded with the newer version of software.

In a variation on this embodiment, the one or more inaccessible nodes in the cluster are prevented from joining the cluster after startup without the newer version of software installed and activated.

In a variation on this embodiment, the system changes a cluster acting version to correspond to the newer version of software.

In a variation on this embodiment, the system enables functionality associated with the newer version of software.

DETAILED DESCRIPTION

Figure 1:
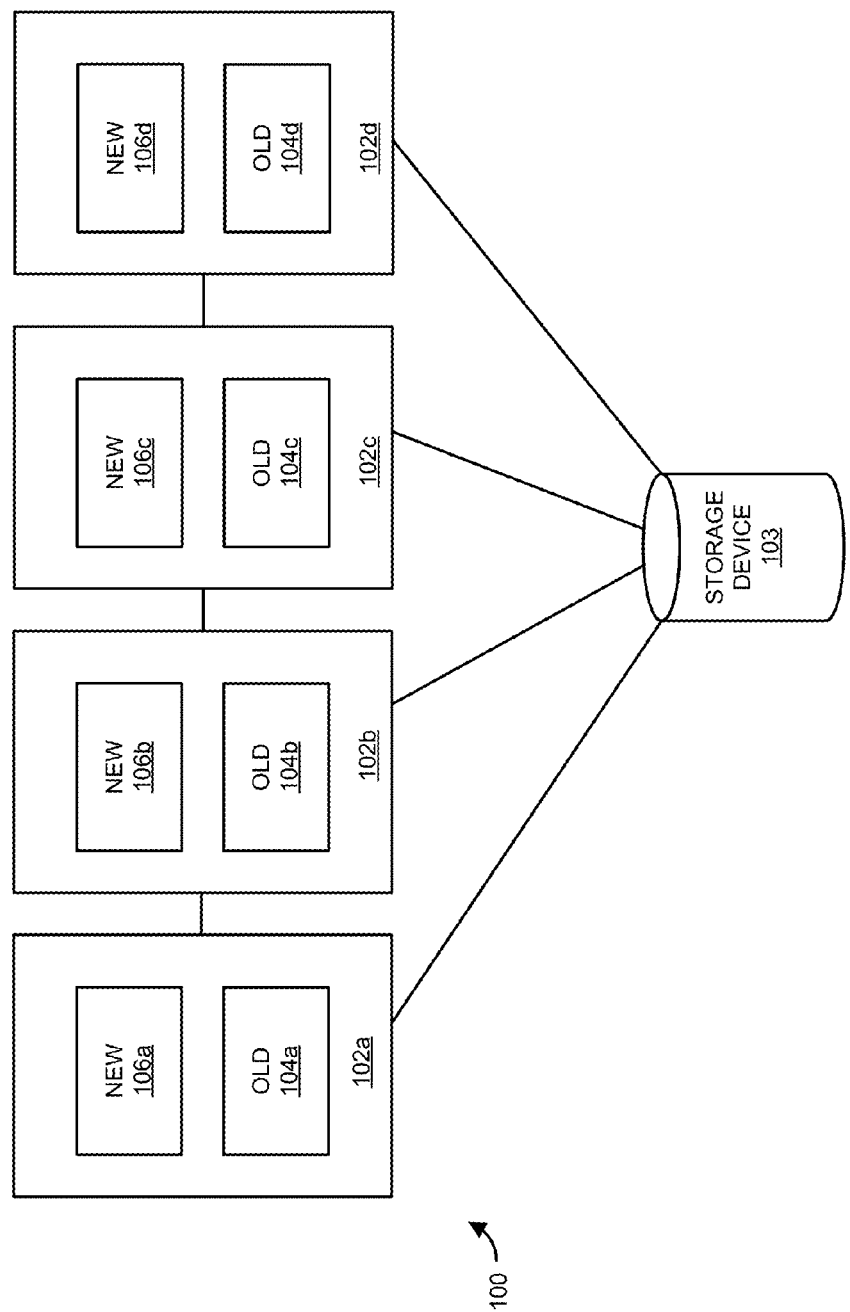
FIG. 1 is a block diagram illustrating an exemplary architecture enabling forcibly completing an upgrade of nodes of a cluster, according to an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention solve the problem of preventing downtime when nodes of a cluster are inaccessible during a rolling cluster upgrade by allowing the forced upgrade of the cluster.

Nodes may become inaccessible before installation or activation of the newer version of software occurs. For example, there may be a fire, faulty circuitry, or some physical lockout problem which brings down the node or breaks the node connectivity with the cluster. When nodes of a cluster become inaccessible during a rolling upgrade, generally there are two different types of scenarios that may occur. In one scenario, a newer version of software required to upgrade the node might not be installed on the node. In another scenario, the newer version of software might be installed on the node but not activated. In both scenarios the nodes are not properly upgraded to support a new cluster acting version.

Rather than requiring termination of operation of the cluster in order to downgrade and remove the inaccessible nodes from the cluster, embodiments of the present invention enable the forced upgrade of the cluster to a new acting version. Notwithstanding the presence of inaccessible nodes that cannot be individually upgraded, the cluster advances forward so nodes operate according to the new acting version supported by the newer version of software. Updating the acting version enables features available in the newer version of the software. The additional functionality and/or bug fixes and/or features associated with the newer version of software are available immediately after the upgrade of the cluster. Furthermore, related database software and other software associated with the cluster may also be upgraded sooner to complement the additional features of the newer version of software.

After the forced upgrade, an administrator may choose between one of two options for rejoining the previously inaccessible node with the cluster. An administrator may choose to remove the node and then add the node back to the cluster membership, causing the system to install and activate the newer version of software on the node. Alternatively, if the node already has the newer version of software installed, then the administrator may choose to activate the newer version of software on the node, and then join the node to the cluster as an active member.

Note that during a rolling upgrade, nodes should not be removed from a tightly coupled clustering environment (e.g., the clustering environment as described in the present disclosure). In tightly coupled clustering environments, all nodes agree to operate in the same cluster, which facilitates avoiding database corruption. Attempts to remove nodes during an upgrade process can have substantial adverse side effects. For example, such adverse side effects include cluster amnesia where the cluster configuration moves back in time to a previous configuration. Data may also become corrupted with the cluster splitting into two different node partitions that overwrite each other. Therefore, embodiments of the present invention are disclosed to manage problematic nodes relating to a rolling upgrade.

Embodiments of the invention as described herein may be implemented for a database or a database management system (DBMS) offered by Oracle® Corporation. The implementation may be on a cluster, such as an Oracle® Real Application Cluster (RAC), or other set of closely cooperating computer systems. The distributed software may comprise a Web server, an application server, database software, or some other type of program. Other embodiments of the invention may also be readily derived from the present disclosure without exceeding the scope of the invention.

Cluster Computing Environment

FIG. 1 is a block diagram illustrating an exemplary architecture enabling forcibly completing an upgrade of nodes of a cluster, according to an embodiment. As illustrated in FIG. 1, an exemplary cluster 100 includes four nodes 102a, 102b, 102c, and 102d that share a storage device 103 (e.g., disk drive). The storage device 103 may store a cluster registry. Such a cluster registry may be, for example, an Oracle® Cluster Registry (OCR). The cluster registry can store all cluster resource and configuration information, including node membership and configuration data. The cluster nodes are in the same network, and can be coupled via any type of communication link(s), which may be wired or wireless, shared or dedicated. The nodes can be coupled via a private (e.g., an intranet) or public (e.g., the Internet) network.

Each node in a group of active nodes (e.g., nodes that are accessible and operating normally) may also execute distributed software to coordinate management of the rolling upgrade. Such distributed software may be configured to allow nodes to publish, broadcast or exchange information such as software version, acting version, cluster membership, group membership, etc. In one embodiment in which the nodes are members of an Oracle® cluster, distributed software may be Oracle® Clusterware.

The cluster may be operating according to an older version of a distributed software. Each of the nodes may be executing the older version of installed distributed software. For example, node 102a is executing the older version of the software, shown as old 104a in FIG. 1. Also, node 102b is executing an older version of the software, shown as old 104b in FIG. 1. Node 102c is executing an older version of the software, shown as old 104c in FIG. 1, and node 102d is also executing an older version of the software, shown as old 104d in FIG. 1.

Note that the software version installed on each node may be a different version, even if all the nodes operate according to a common acting version. The newest version of the software installed and activated on a node is considered that node's software version. The nodes of a cluster operate at a common level called the acting version. The acting version of the distributed software is a version that can be supported by each node in the cluster. In some implementations, when forcing the upgrade, the system stores data indicating that the upgrade is forced and updates the acting version data stored in storage device 103.

To facilitate tracking each node's status, the software version parameters may be stored in a central repository accessible to all nodes, such as shared storage 103. The software version of each node can be stored in the cluster registry. The central repository may also store the current acting version and other parameters. Access to the central repository may be limited to a single node (e.g., a cluster master) or may be available to all or a specified subset of the nodes. Note that, in various implementations, instead of a shared storage device, information may be replicated on each node. Embodiments of the present invention are not limited to the nodes sharing a shared storage device.

When upgrading the cluster or installing a newer version of software in the cluster, an administrator may initially install the newer version of software on the node 102a. The newer version of software is shown as new 106a in FIG. 1. The system then copies the newer version of software to the other nodes of the cluster. The newer version of software is shown as new 106b, new 106c, and new 106d, on nodes 102b, node 102c, and node 102d, respectively. In some cases, the system is able to copy the newer version of software to all the nodes of the cluster. If the installation and activation of the software on all the nodes proceeds normally, then the entire cluster can be upgraded to a new acting version corresponding to the newer version of software. However, if there are any problems in upgrading the individual nodes, then the problematic nodes can potentially affect the upgrade of the cluster.

As discussed previously, the system can perform rolling upgrades so that the upgrade of the distributed software from one version to another is performed on a rolling (e.g., node-by-node) basis. Rolling upgrades allow a business to continue operation during the automated upgrade process. During a rolling upgrade, the nodes all operate according to a specified acting version of the distributed software. The nodes may execute different versions of the same software simultaneously, and thus the nodes can be upgraded in any sequence, over any period of time.

The upgrade of the cluster may complete automatically when all nodes have been upgraded to the same version. When the cluster upgrade is complete, and whenever the acting version changes, each node automatically begins operating with the functionality of the new acting version, or is automatically instructed to begin operating with such functionality. For example, a different message format or new network protocol may be implemented, data may be stored on storage device 103 in a different format or manner, etc. Existing data (e.g., a database) may be automatically updated to the new format. This update may be performed in real-time, offline, as resources allow, or in some other manner.

Typically, when all nodes have been upgraded to a version newer than the current acting version, the acting version is reset to the highest software version supported by all the nodes. A node attempting to join the cluster may be required to have a software version greater than or equal to the acting version. However, in various scenarios described below, one or more nodes of the cluster (e.g., node 102d) may become inaccessible prior to completing an upgrade to the newer version of the software.

Overview of Process for Forcibly Upgrading a Cluster

Figure 2:
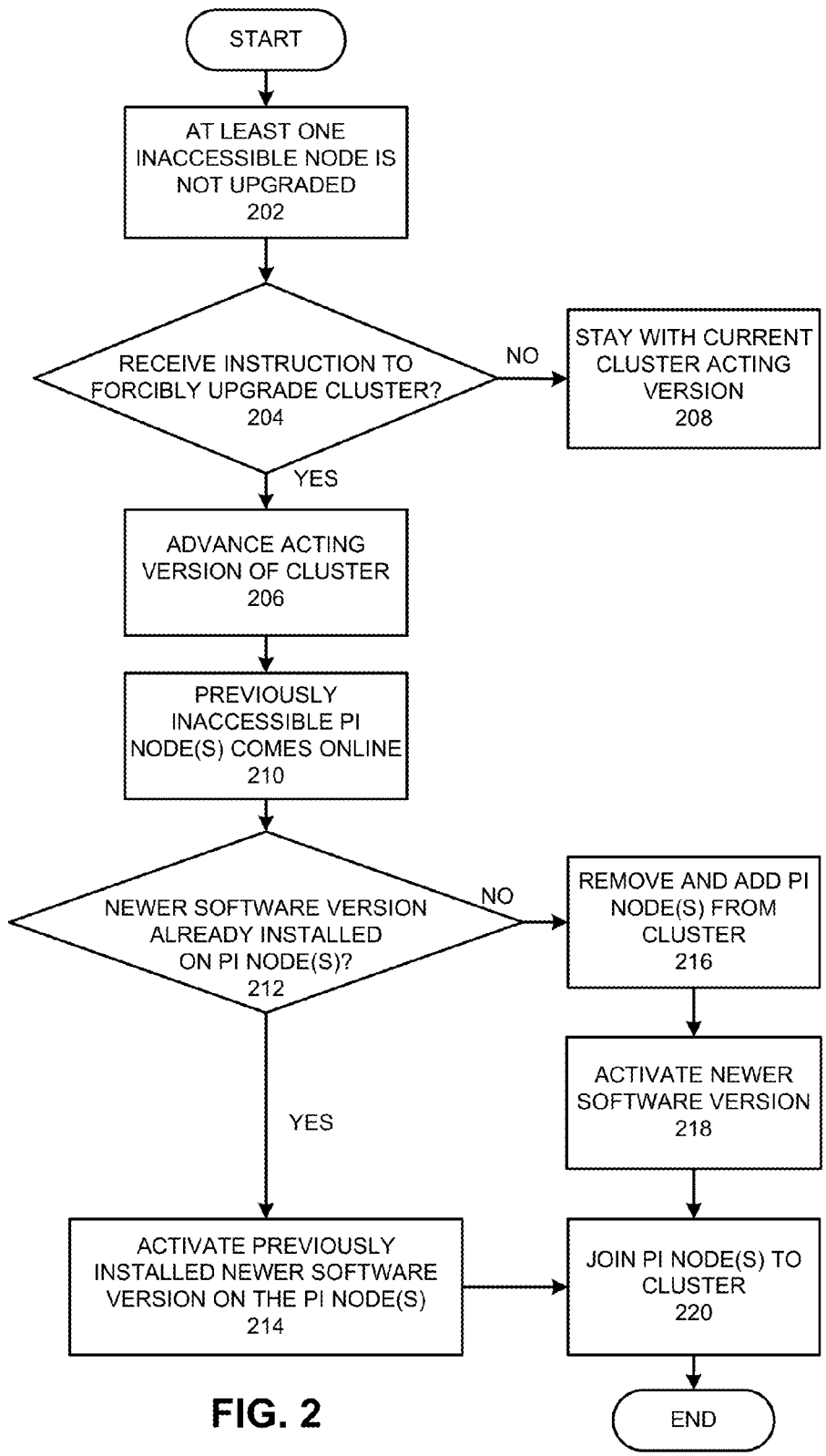
FIG. 2 is a flowchart illustrating an overview of an exemplary process for forcibly upgrading a cluster, according to an embodiment.

FIG. 2 is a flowchart illustrating an overview of an exemplary process for forcibly upgrading cluster 100, according to an embodiment. During operation, the system attempts to upgrade distributed software operating in each of the nodes of cluster 100. However, in various scenarios, at least one node of cluster 100 fails and becomes inaccessible. The system does not successfully complete the upgrade process for all the nodes of the cluster (operation 202). The node (or nodes) may not properly install the newer version of software or may not activate the newer version of software prior to becoming inaccessible. For example, a node upgrade script may not properly execute on the inaccessible nodes. If the system receives instruction (e.g. through user input) to forcibly upgrade the cluster (operation 204), then the system advances the acting version associated with cluster 100 (operation 206). Otherwise, the system does not change the current acting version associated with cluster 100 (operation 208).

In some embodiments, the system may receive the instruction to forcibly upgrade the cluster from the administrator at any node that has been upgraded. In some implementations, the administrator may use a command line interface with a script to force upgrade, e.g., the script invocation in one implementation is "#/u01/app/11.2.0/grid/rootupgrade—force." Administrators may also query the system to determine the current acting version associated with the cluster, in order to verify that the upgrade is complete. After the force upgrade is complete, the administrator can remove the inaccessible node from the cluster.

If a previously inaccessible node starts up and comes back online (operation 210), the node is prevented from joining the cluster as an active node. The node is now accessible to the rest of the cluster, but the node cannot join the cluster yet. Two options are available for upgrading the node so that the node can join the cluster, depending on the circumstances. First, the system may activate a previously installed newer version of the software on the node (e.g., according to administrator instruction or predetermined stored instructions), thereby facilitating joining the node back to the cluster. Second, the system may remove the node from the cluster and add the node back to the cluster (e.g., according to administrator instruction). The addition process may include the system copying (e.g. as part of the adding process) and activating the newer version of software to facilitate joining the node back to the cluster.

In one embodiment, the administrator determines whether the newer version of software is already installed on the previously inaccessible node (operation 212) in order to pick from one of the two options for handling a recovered node. Note that various system features can facilitate determining whether the newer version of software is already installed on the previously inaccessible node. For example, the system may provide a visual indication or some other text notification to the administrator that the newer version of software is already installed on the previously inaccessible node. Various implementations may also include a script to automatically select from one of the two options. A script can facilitate automatic detection of the installed software by the system, and such a script can choose the appropriate option to join the node back to the cluster.

Under an activate option, the system facilitates activating a newer version of software that is installed on a node before the node becomes inaccessible (operation 214). For example, the system may provide a set of tools via a command line interface and/or a visual interface to allow the administrator to activate the newer version of software. The system may receive instructions and/or parameters from the administrator to activate the newer version of software or may retrieve the parameters from storage. Embodiments of the present invention are not limited to any particular techniques for receiving instructions and/or parameters applicable to activating the newer version of software. The previously inaccessible node then joins cluster 100 (operation 220) after completion of the activation.

Under a remove and add option, the system facilitates removing and adding the previously inaccessible node back to cluster 100 (operation 216). The remove and add option is usually applicable when the newer version of software is not installed before the node goes down. However, note that the administrator may choose to remove and add the node under any circumstances, e.g. even if the newer version of software has been previously installed before the node goes down. Note that the administrator may also remove the previously inaccessible node without adding the node back to the cluster.

The system may receive instructions from the administrator to perform the removing and adding operations. For example, the system may provide a set of tools via a command line interface and/or a visual interface to allow the administrator to remove and add the node. Embodiments of the present invention are not limited to any particular techniques for receiving instructions related to removing and adding the node.

By removing the previously inaccessible node from the cluster configuration, the cluster does not retain any data regarding the node. In effect, when the node is added back to the cluster, the cluster handles the node as if the node has never joined the cluster before. Note that adding a node to the cluster allows for the activation of the node, but the node is inactive and does not operate with the cluster until the node joins the cluster as an active node. Further, a node that has been added to the cluster must still rejoin the cluster each time the node is restarted.

As part of adding the node back to cluster 100, the system and/or administrator can copy the newer version of software for installation, and then activate the software (operation 218). The various steps may be performed manually and/or automatically by the system and/or the administrator. In some embodiments, the system can automatically perform the installing and/or activating steps when the system receives an instruction to add the node back to cluster 100. The previously inaccessible node then joins cluster 100 and becomes active. The node operates and communicates at the acting version associated with cluster 100 corresponding to the newer version of software (operation 220). Note that the installation of the newer version of software on the node can be a clean installation (e.g., not an upgrade from currently installed software) when the node is added back to cluster 100. In some implementations, the system can perform the steps for removing and adding the node according to a script.

In some embodiments, the system performs the forced upgrade for the cluster only if nodes with failed upgrades have inactive status. A node has an inactive status if the node is down, the clustering service on the non-upgraded node is down, or the synchronization service on the node is down. The system can perform a cluster pre-check prior to forcibly upgrading the cluster. The system may abort the forced upgrade if any node of the cluster has failed to upgrade but is active and accessible. The system may notify the administrator that the forced upgrade is aborted, and instruct the administrator to upgrade the accessible and active node prior to attempting the forced upgrade. To proceed with the forced upgrade, the administrator may choose to upgrade the node, terminate the clustering service on the node, or shut down the node. After successfully forcibly upgrading the cluster, the system can notify the administrator of the successful outcome, and also indicate which nodes were not accessible and therefore not upgraded with the rest of the cluster nodes. The administrator may then remove the node from the cluster, or perform the steps of the remove and add option or the activate option to upgrade and join the node to the cluster.

In some embodiments, an administrator may choose to perform a non-rolling upgrade of the cluster. In a non-rolling upgrade, all the nodes of the cluster go down, and the entire cluster becomes unavailable. The administrator may upgrade each node of the cluster individually. In various implementations, the techniques described herein can facilitate avoiding another cluster outage when any one of the nodes of the cluster are inaccessible. The administrator may forcibly upgrade the cluster and the associated nodes, despite the inaccessibility of one or more down nodes. The system activates the newer version of software, and previously inaccessible nodes can join the cluster after the nodes become accessible. By forcing the upgrade, a second outage of the cluster being upgraded can be avoided.

Note that for simplicity of illustration, the figures and specification of the present disclosure may discuss scenarios with one node becoming inaccessible and rejoining an upgraded cluster. However, those of ordinary skill in the art will recognize that any number of nodes may become inaccessible and rejoin the upgraded cluster with the newer version of software according to the processes disclosed herein.

Node is Inaccessible Before Installation of Newer Version of Software

Figure 3:
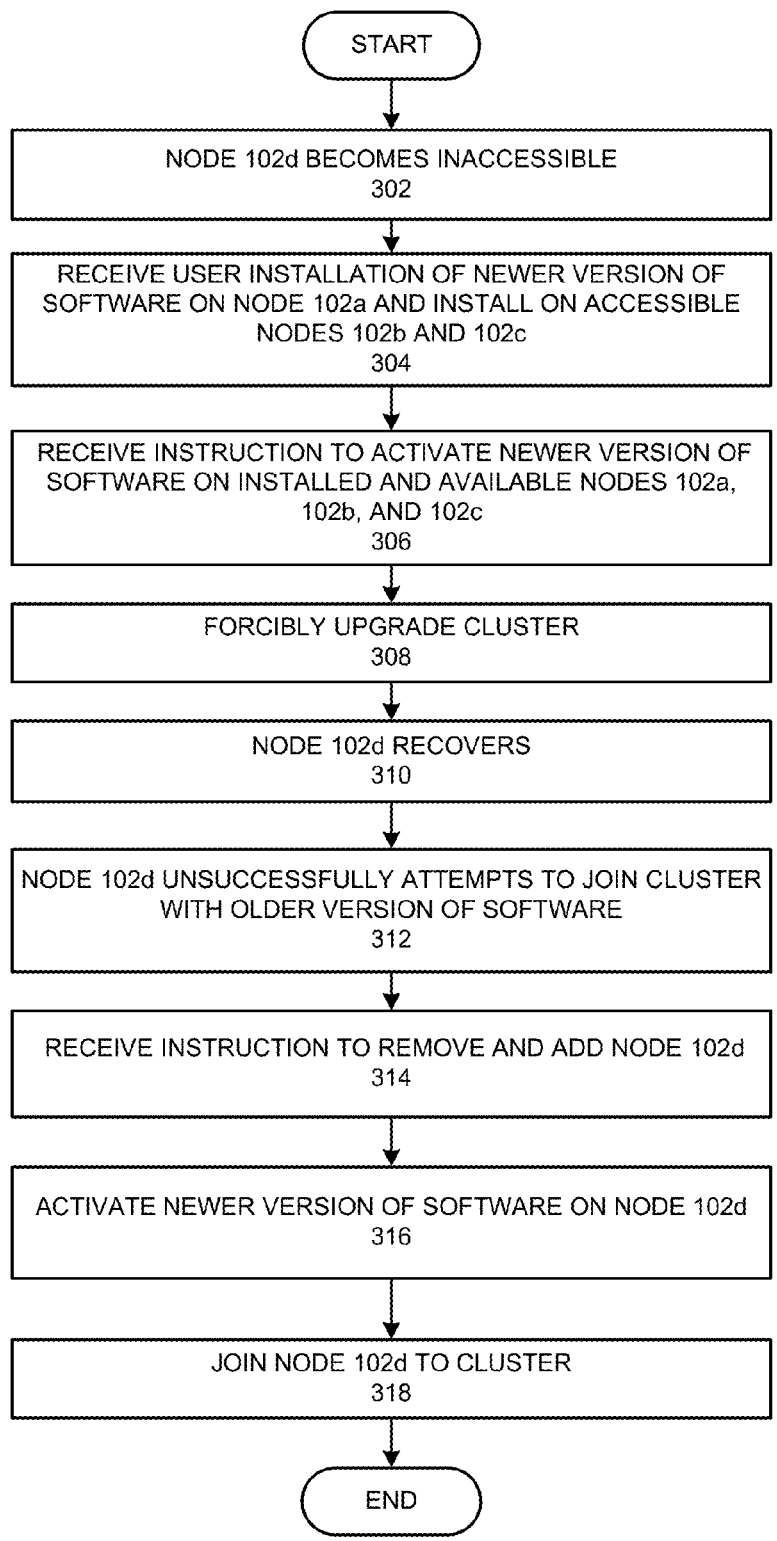
FIG. 3 is a flowchart illustrating an exemplary process for forcibly upgrading the cluster when a node is inaccessible before installation of the newer version of software, according to an embodiment.

FIG. 3 is a flowchart illustrating an exemplary process for forcibly upgrading cluster 100 when a node is inaccessible before installation of the newer version of software, according to an embodiment. In the example process illustrated in FIG. 3, a node goes down and becomes inaccessible before the newer version of software may be installed on the node. During operation, a node (e.g., node 102d) becomes inaccessible before installation of the newer version of software (operation 302). The system receives the installation of the newer version of software on node 102a, and proceeds to also install the software on the accessible nodes (e.g., node 102b and node 102c) (operation 304). The system then receives an instruction to activate the installed newer version of software on the available nodes (e.g. node 102a, node 102b, and node 102c) (operation 306), and performs the activating process accordingly. Note that for the processes described in FIG. 3 and FIG. 4, the system can also automatically perform the activating process after installation, in various implementations.

Subsequently, the system receives an instruction to forcibly upgrade cluster 100, and the system forcibly upgrades cluster 100 in response (operation 308). The system may receive the instruction from the administrator. The acting version associated with cluster 100 changes to correspond to the newer version of software. The additional functionality and/or bug fixes and/or features of the software are immediately enabled and made available to clients of cluster 100. Sometime later, node 102d recovers (operation 310) and unsuccessfully attempts to join cluster 100 with an older version of the software (operation 312). However, any node that is executing the older version of the software cannot join cluster 100.

The system receives an instruction to remove node 102d from cluster 100 and add node 102d to cluster 100 (operation 314). This instruction can be issued by the administrator. The node that is removed is the node that is not upgraded (e.g., node 102d). Note that the system copies the newer version of software to node 102d as part of adding node 102d to cluster 100. The system activates the newer version of software on node 102d (operation 316) based on user input and/or predetermined configuration data. Node 102d then joins cluster 100 (operation 318) as an active node.

Node Becomes Inaccessible after Installation of Newer Version of Software

Figure 4:
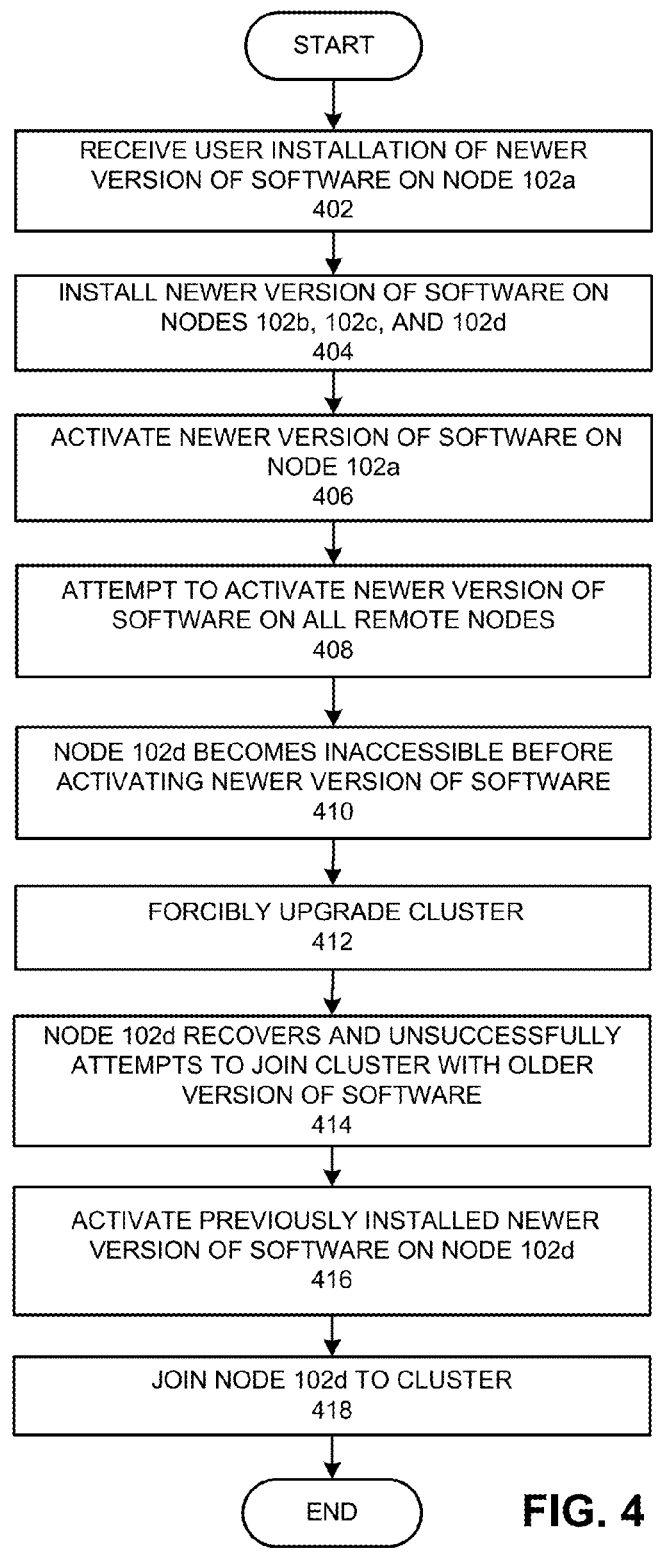
FIG. 4 is a flowchart illustrating an exemplary process for forcibly upgrading the cluster when the node becomes inaccessible after installation of the newer version of software, according to an embodiment.

FIG. 4 is a flowchart illustrating an exemplary process for forcibly upgrading cluster 100 when the node becomes inaccessible after installation of the newer version of software, according to an embodiment. In the example process illustrated in FIG. 4, a node goes down and becomes inaccessible after the newer version of software is installed on the node, but before the software can be activated. During operation, the system initially receives user installation of the newer version of software associated with the distributed software on a node, such as node 102a (operation 402). For example, an administrator may utilize a digital video disc (DVD) with the installation software to install the newer version of software. Note that the administrator may also install the software via any other means, such as downloading and installing the software from the hard drive. The embodiments depicted in FIG. 3 and FIG. 4 are not limited to any particular means for installing the newer version of software.

The system then proceeds to copy and install the newer version of software on nodes 102b, 102c, and 102d (operation 404). Subsequently, the system activates the newer version of software on node 102a (operation 406). The system then attempts to activate the newer version of software on all the remote nodes 102b, 102c, and 102d (operation 408). Note that the system may perform the copy, install, and activate steps in accordance with administrator instructions and/or according to some type of automated process. The steps may also be performed according to a mix of administrator instructions and/or automated pre-stored instructions.

In the scenario illustrated in FIG. 4, node 102d becomes inaccessible before activation of the newer version of the software (operation 410). For example, the physical computer hardware that hosts node 102d may be located in a geographic region that suffers an electrical outage after installation of the newer version of the software. The system may receive an instruction to forcibly upgrade cluster 100, and the system performs the forced upgrade (operation 412). In some embodiments, the system may notify the administrator that one or more nodes of cluster 100 are inaccessible. The system may ask the administrator if the system should proceed with a forced upgrade. An administrator can then issue instructions to the system to forcibly upgrade the cluster 100.

After the forced upgrade, nodes in cluster 100 operate at the new acting version corresponding to the newer version of software. Any additional functionality and/or features associated with the newer version of software is immediately available to clients (e.g. end-users) of cluster 100. Any bug fixes in the newer version of software also immediately take effect following the forced upgrade. At some time after forcing the upgrade of cluster 100, node 102d recovers and unsuccessfully attempts to join cluster 100 with the older version of the software installed on node 102d (operation 414). Because node 102d has not yet successfully activated the newer version of software that supports the current acting version associated with cluster 100, node 102d may not join cluster 100. The administrator may activate the previously installed newer version of software on node 102d (operation 416). In some implementations, a script may also automatically activate the previously installed software on node 102d. After activation, node 102d supports the additional functionality and/or features associated with the newer version of software. Node 102d can then join cluster 100 (operation 418).

Note that although FIG. 3 and FIG. 4 describe specific nodes of an example cluster to illustrate the disclosed processes, in various implementations any node or nodes may be involved in different ways with the disclosed processes. For example, any node may become inaccessible during the upgrade of the nodes. Any node other than node 102a can also be the first node used for installation. Furthermore, any number of nodes 102a, 102d or 102c can also fail to install or activate the newer version of software when another node is used to initiate the installation process.

Exemplary Computer System

Figure 5:
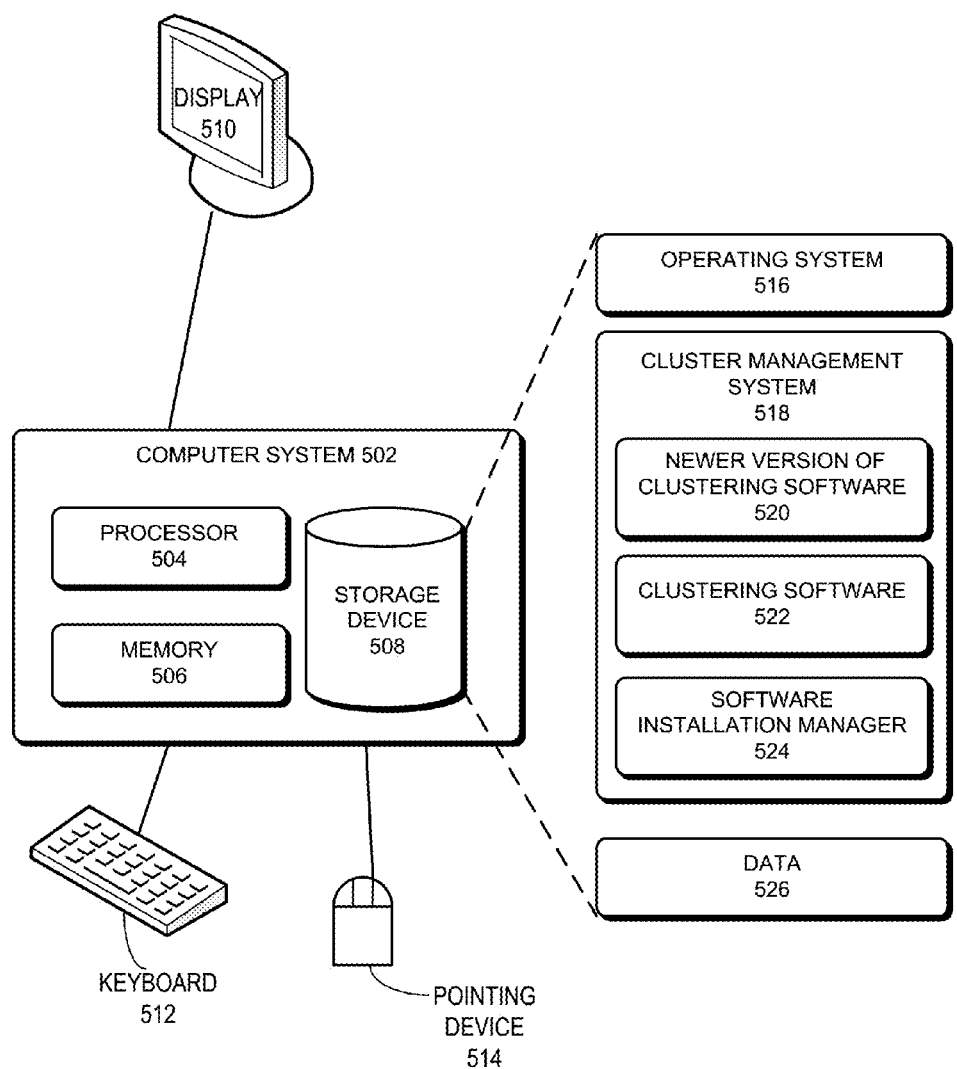
FIG. 5 illustrates an exemplary computer system that facilitates forcibly upgrading nodes of a cluster, in accordance with an embodiment of the present invention.

FIG. 5 illustrates an exemplary computer system that facilitates forcibly upgrading nodes of a cluster, in accordance with an embodiment of the present invention. Computer system 502 includes a processor 504, a memory 506, and a storage device 508. Furthermore, computer system 502 can be coupled to a display device 510, a keyboard 512, and a pointing device 514. Storage device 508 can store an operating system 516, a cluster management system 518, and data 526. Cluster management system 518 can include newer version of clustering software 520, clustering software 522, and a software installation manager 524. Software installation manager 524 can perform the steps of installing and activating the newer version of software. Note that cluster management system 518 can be any system that implements the techniques discussed in the present disclosure.

Cluster management system 518 can include instructions, which when executed by computer system 502, can cause computer system 502 to perform methods and/or processes described in this disclosure. Specifically, cluster management system 518 may include instructions for forcibly completing an upgrade of a cluster in the presence of one or more inaccessible nodes belonging to the cluster.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating an upgrade of a cluster of servers in the presence of one or more inaccessible nodes in the cluster, comprising:
   receiving an instruction to upgrade an older version of a distributed software program installed on each of a plurality of nodes forming the cluster;
   installing and activating a newer version of the distributed software program on a subset of the plurality of nodes, the subset having fewer nodes than the entire cluster, and the subset of the plurality of nodes continuing to operate according to an older acting version of the distributed software program;
   receiving an instruction to forcibly upgrade the cluster; and upgrading the cluster so that the subset of nodes cease to operate according to the older acting version of the distributed software program and begin to operate according to a newer acting version of the distributed software program, wherein each node remains a member of the cluster during the upgrade, and wherein the newer version of the distributed software program can operate according to the older acting version corresponding to the older version of the distributed software program, and can also operate according to the newer acting version of the distributed software program.

2. The method of claim 1, further comprising:
removing a node from the cluster in response to an instruction to remove the node from the cluster;
receiving an instruction to add the node to the cluster;
activating the newer version of the distributed software program on the node; and
joining the node to the cluster so that the node becomes an active member of the cluster.

3. The method of claim 1, further comprising:
activating a copy of the newer version of the distributed software program previously installed on an inactive node in the cluster; and
joining the node to the cluster so that the node becomes an active member of the cluster.

4. The method of claim 1, further comprising:
displaying a message indicating one or more nodes of the cluster have not been upgraded with the cluster upgrade.

5. The method of claim 1, wherein the cluster remains operational during the upgrade of the cluster; and wherein at least one node of the cluster remains inaccessible for a duration of time after the upgrade of the cluster.

6. The method of claim 1, wherein the force upgrade instruction is sent from an administrator and received through one of the subset of nodes.

7. The method of claim 1, further comprising:
performing a pre-check prior to performing the upgrade on the cluster, and aborting the upgrade if any accessible node of the cluster has not been upgraded with the newer version of the distributed software program.

8. The method of claim 1, wherein the one or more inaccessible nodes in the cluster are prevented from joining the cluster after startup without the newer version of the distributed software program installed and activated.

9. The method of claim 1, further comprising changing a cluster acting version to correspond to the newer version of the distributed software program.

10. The method of claim 1, further comprising enabling functionality associated with the newer version of the distributed software program.

11. A computing system for facilitating an upgrade of a cluster of servers in the presence of one or more inaccessible nodes in the cluster, the system comprising:
one or more processors,
a computer-readable medium coupled to the one or more processors having instructions stored thereon that, when executed by the one or more processors, cause the one or more processors to perform operations comprising:
receiving an instruction to upgrade an older version of a distributed software program installed on each of a plurality of nodes forming the cluster;
installing and activating a newer version of the distributed software program on a subset of the plurality of nodes, the subset having fewer nodes than the entire cluster, and the subset of the plurality of nodes continuing to operate according to an older acting version of the distributed software program;
receiving an instruction to forcibly upgrade the cluster; and
upgrading the cluster so that the subset of nodes cease to operate according to the older acting version of the distributed software program and begin to operate according to a newer acting version of the distributed software program, wherein each node remains a member of the cluster during the upgrade, and wherein the newer version of the distributed software program can operate according to the older acting version corresponding to the older version of the distributed software program, and can also operate according to the newer acting version of the distributed software program.

12. The computing system of claim 11, wherein the computer-readable storage medium stores additional instructions that, when executed, cause the one or more processors to perform additional steps comprising:
removing a node from the cluster in response to an instruction to remove the node from the cluster;
activating the newer version of the distributed software program on the node; and
joining the node to the cluster so that the node becomes an active member of the cluster.

13. The computing system of claim 11, wherein the computer-readable storage medium stores additional instructions that, when executed, cause the one or more processors to perform additional steps comprising:
activating a copy of the newer version of the distributed software program previously installed on an inactive node in the cluster; and
joining the node to the cluster so that the node becomes an active member of the cluster.

14. The computing system of claim 11, wherein the computer-readable storage medium stores additional instructions that, when executed, cause the one or more processors to perform additional steps comprising:
displaying a message indicating one or more nodes of the cluster have not been upgraded with the cluster upgrade.

15. The computing system of claim 11, wherein the cluster remains operational during the upgrade of the cluster; and wherein at least one node of the cluster remains inaccessible for a duration of time after the upgrade of the cluster.

16. The computing system of claim 11, wherein the force upgrade instruction is sent from an administrator and received through one of the subset of nodes.

17. The computing system of claim 11, wherein the computer-readable storage medium stores additional instructions that, when executed, cause the one or more processors to perform additional steps comprising:
performing a pre-check prior to performing the upgrade on the cluster, and aborting the upgrade if any accessible node of the cluster has not been upgraded with the newer version of the distributed software program.

18. The computing system of claim 11, wherein the one or more inaccessible nodes in the cluster are prevented from joining the cluster after startup without the newer version of the distributed software program installed and activated.

19. A non-transitory computer-readable storage medium storing instructions that, when executed by a computer, facilitates an upgrade of a cluster of servers in the presence of one or more inaccessible nodes in the cluster, the method comprising:

receiving an instruction to upgrade an older version of a distributed software program installed on each of a plurality of nodes forming the cluster;

installing and activating a newer version of the distributed software program on a subset of the plurality of nodes, the subset having fewer nodes than the entire cluster, and the subset of the plurality of nodes continuing to operate according to an older acting version of the distributed software program;

receiving an instruction to forcibly upgrade the cluster; and upgrading the cluster so that the subset of nodes cease to operate according to the older acting version of the distributed software program and begin to operate according to a newer acting version of the distributed software program, wherein each node remains a member of the cluster during the upgrade, and wherein the newer version of the distributed software program can operate according to the older acting version corresponding to the older version of the distributed software program, and can also operate according to the newer acting version of the distributed software program.

20. The non-transitory computer-readable storage medium of claim 19, wherein the computer-readable storage medium stores additional instructions that, when executed, cause the computer to perform additional steps comprising:

removing a node from the cluster in response to an instruction to remove the node from the cluster;

receiving an instruction to add the node to the cluster;

activating the newer version of the distributed software program on the node; and joining the node to the cluster so that the node becomes an active member of the cluster.

* * * * *